March 30, 1954      J. G. BEARD      2,673,956
TIME INTERVAL MEASUREMENT
Filed Sept. 22, 1949      2 Sheets-Sheet 1
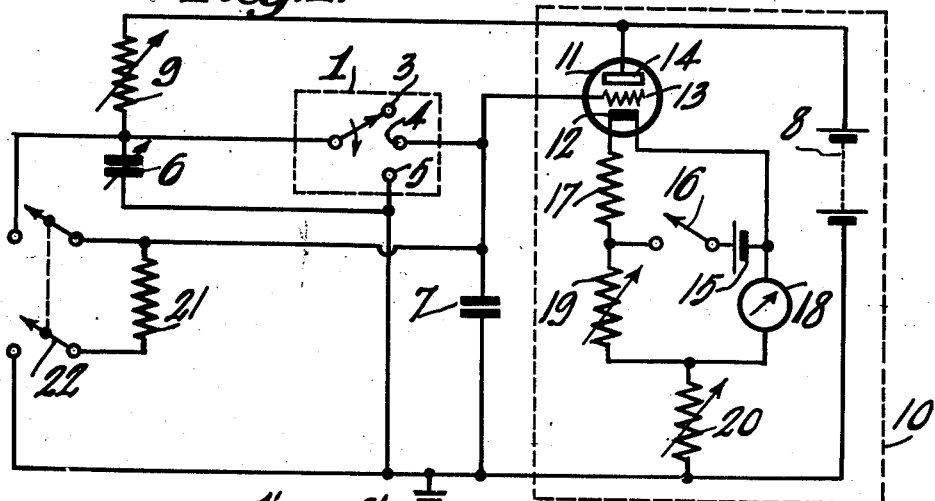
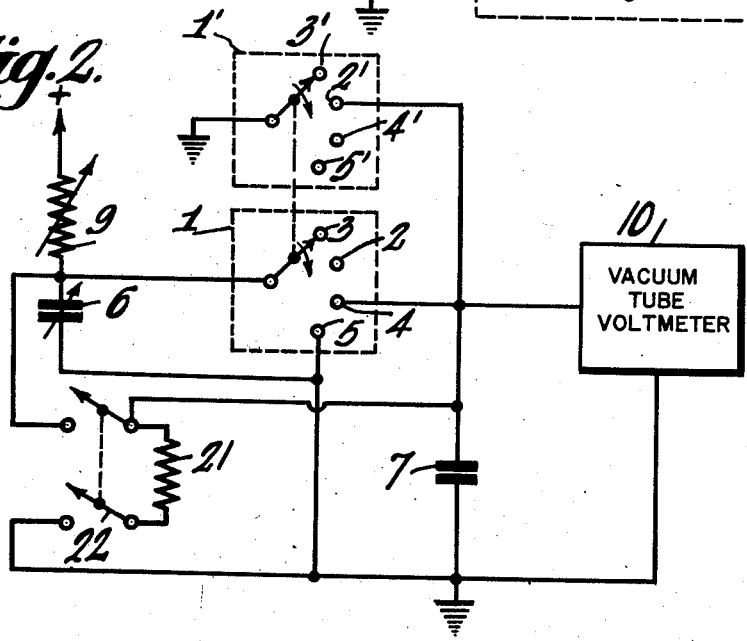
INVENTOR
Joseph G. Beard
BY
Conder C. Henry
ATTORNEY

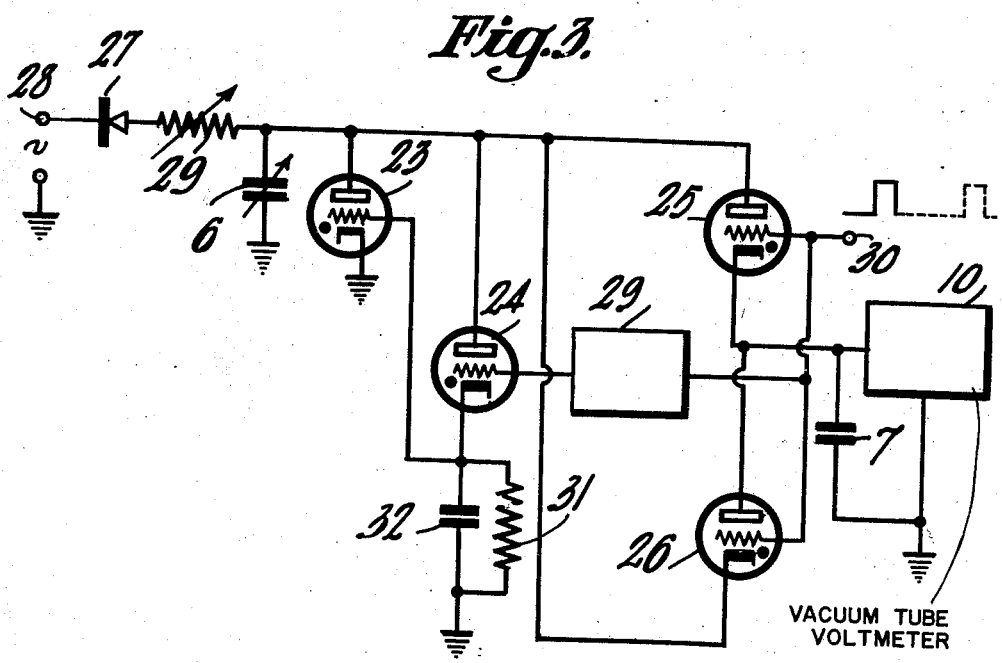

Patented Mar. 30, 1954

2,673,956

UNITED STATES PATENT OFFICE 2,673,956

TIME INTERVAL MEASUREMENT

Joseph G. Beard, Haddonfield, N. J., assignor to Radio Corporation of America, a corporation of Delaware Application September 22, 1949, Serial No. 117,231

3 Claims. (Cl. 324—68)

My invention relates to a method and apparatus for the measurement of time, more particularly for the measurement of successive time intervals.

It has proven desirable in certain circumstances to have means available by which successive short time intervals may be measured. Stop watches may be used for this purpose. However, if a single stop watch is used, because of the necessity for resetting the instrument, it would require great dexterity on the part of the operator to obtain a reading and at the same time reset to begin timing the next interval. If a multiplicity of stop watches are used, errors would be introduced which are dependent on the ability of the operator. Electronic devices also have been provided for measuring time intervals. However, such devices which have been thus far evolved do not provide for the storage of the indication of one time interval while the indication of the next successive interval is being obtained.

It is consequently an object of my invention to provide a method and apparatus for continuously measuring each successive time interval without the risk of missing alternate intervals.

A further object of my invention is to provide means for maintaining the indication of one time interval while the next succeeding interval is being timed.

By way of summary, my invention may be explained as follows:

At the beginning of a time interval a condenser is started charging through a resistor. At the end of the interval the charge on the condenser is indicative of the time elapsed. Through a switching arrangement the above charge is substantially instantaneously transferred to a second condenser, and the first condenser is immediately and substantially instantaneously discharged and started charging for the next time interval. Since there is no discharge path for said second condenser, the charge will remain thereon for a considerable length of time, or until such a discharge path is provided. There is a potential measuring device connected to the second condenser by means of which the potential produced by the charge on the second condenser may be ascertained while the first condenser is being charged in accordance with the next succeeding time interval.

A better understanding of my invention may be had from the following detailed description when taken in conjunction with the accompanying drawings in which—

Fig. 1 is a schematic representation of a circuit embodying my invention utilizing mechanical switching means.

Fig. 2 shows a modification of the arrangement of Fig. 1, and

Fig. 3 shows schematically, a completely electronic circuit which will accomplish the object of my invention.

Referring to the drawings, it will be seen in Fig. 1, that I have provided, a sequential switch 1, having a common terminal connected to the contact arm and three contact positions 3, 4, and 5. A sequential switch as here employed is one which will effect the connection of a common lead to a plurality of separate and distinct contacts in a predetermined sequence, and is capable of repeating the sequence without first reversing the sequence. For purposes of illustration I have shown the switch as having a rotating contact arm which is normally at rest on the first contact position 3, and when actuated, rotates through 360°, touching the second and third contact positions and continuing to its normal position. Such switches are well known in the art, and any switch that will effect these connections may be used.

I have also provided a first condenser 6 and a resistor 9 serially connected to a source of potential 8. The common terminal of the switch 1 is connected to the junction between the condenser 6 and the resistor 9. The first contact position 3 of the switch 1 is an open circuit. A second condenser 7 is connected between the second contact position 4 and ground. The third contact position 5 is connected to short circuit the first condenser 6. Connected across the second condenser 7 there is a potential measuring device. While any type of voltage measuring device having a negligible drain on the voltage source may be used, I have here represented it as a vacuum tube voltmeter shown in the dotted block 10. The vacuum tube 11 of the voltmeter is preferably one that has a high input impedance, on the order of $10^{14}$ ohms. The grid 13 of the vacuum tube is connected to the positive side of the second condenser 7, while the anode 14 is connected to the source of potential 8. In the cathode circuit of the tube 11 there is a source of filament current 15 connected through a switch 16, and a cathode resistor 17 to the filamentary cathode 12. Serially connected between the cathode and ground there is a microammeter 18 and a variable resistor 20. A variable resistor 19 is connected in shunt with the meter 18, the switch 16, and the source of cathode current 15, For calibration purposes I have provided a resistor 21 and a double pole, single throw switch 22, which, when the switch 22 is closed, forms a shunt path through said resistor 21 around the first condenser 6. The junction point between the high potential side of the resistor 21 and the switch 22 is connected to the grid 13 of the vacuum tube 11.

With all of the switches in the positions shown in Fig. 1, the system is turned off. To calibrate the instrument the switch 16 is closed. This causes the filament to heat and consequently causes anode current to flow through the tube and hence through the meter and the resistor 20. The resistor 19 is then adjusted to cause a portion of the current from the filament source 15 to flow through the meter in opposition to the anode current so that the meter reads zero when there is no charge on the condenser 7. Switch 22 is then closed. This causes current from the source 8 to flow through the voltage divider composed of resistors 9 and 21. The mid-point of this potential divider is connected to the high potential side of the second condenser 7, and hence to the grid 13 of the tube 11, causing increased current to flow through the tube. The resistor 20 is then adjusted to produce full scale deflection of the meter for the maximum anticipated potential across the second condenser 7. Switch 22 is then opened and the system is ready for use.

To operate the system the switch 1 is actuated at the beginning of the interval to be timed. This discharges the condenser 6 as the arm reaches the third contact position and allows it to begin recharging through the resistor 9. The resistor 9 and the condenser 6 are so chosen that the time constant of the combination is several times the maximum time interval to be measured. This will permit operation on the more linear part of the condenser charging curve. At the end of the first time interval, which is the beginning of the next succeeding interval, the switch 1 is again actuated. As the switch contact arm comes into contact with the second contact position 4, a portion of the charge on the first condenser 6 is immediately transferred to the second condenser 7, producing thereon a potential proportional to the potential attained by the first condenser depending on the ratio of the capacitances of the respective condensers. The contact arm continues rotating until it reaches the third contact position 5, at which point the first condenser is substantially instantaneously discharged through the short circuit path around said condenser. As soon as the contact arm leaves the third contact, or short circuit position, the first condenser begins to recharge for the next succeeding interval. It is to be understood that while each of the above contacts and operations are separate and distinct, the full sequence is achieved almost instantaneously.

The potential on the second condenser is applied to the grid 13, of the vacuum tube 11, causing an increased current, proportional to the charge on said second condenser, to flow through the tube and hence through the meter. Since the charge on the condenser was a function of the charging time, and the additional current through the meter is proportional to the charge, the meter reading is an indication of the time elapsed. Since the input impedance of the tube is very high, the charge on the condenser 7 will not appreciably deteriorate for several minutes. Therefore the meter indication for one time interval may be read, while the first condenser is recharging for the next succeeding interval, and the operation is repeated.

Inasmuch as the charge transferred from the first condenser 6 to the second condenser 7 is proportional to the relative capacitances of the two condensers, and the relative potentials to which they are charged, it may be seen that, in the arrangement of Fig. 1, the indication would be progressively more accurate provided the successive time intervals were of substantially the same duration. However, if the intervals were of varying lengths, proportionate inaccuracies would be introduced by the charges remaining on the second condenser 7.

In order to increase the utility of the device to include those situations where the successive intervals are of varying duration, means may be provided whereby the second condenser 7 is discharged during the interval while the contact arm of the switch 1 is moving from its normal rest position 3 to its charge transfer position 4. Thus the ratio of potentials on the two condensers will be constant irrespective of the relative duration of the successive time intervals.

One arrangement by means of which this result may be achieved is shown in Fig. 2 where there is provided a first switch 1, similar to that provided in the arrangement of Fig. 1, but differing in that the switch is provided with an additional open contact 2. There is further provided a second switch 1', here shown as having four contact positions 2', 3', 4', and 5'. The first switch 1 and the second switch 1' are electrically independent but are cooperatively connected mechanically. The first, third, and fourth contact positions, 3', 4', and 5', of the second switch 1', are open contacts, while the second position 2' connects the high potential side of the second condenser 7 to ground. The switches, as here shown, are merely illustrative of the timing and sequence of operations involved in the operation of this modification of my invention and it is not intended that the invention should be limited to the specific switching devices shown.

In the arrangement of Fig. 2, switch 1 is actuated to begin the operation, as in the circuit of Fig. 1. However, the contact arm of the second switch 1' now moves in synchronism with that of the first switch 1. Both contact arms arrive at their corresponding second contact position, 2 and 2', imultaneously. In the first switch 1, the second contact position 2 is an open contact, but the second contact position 2', of the second switch 1', provides a short circuit path to ground for the second condenser 7, thus substantially discharging it of any previous charge that may have been thereon. The contact arms of both switches then move to their respective third contact positions 4 and 4'. The operation now continues as in the arrangement of Fig. 1 and the charge stored on condenser 6 is transferred to condenser 7 where it may be read at any convenient time prior to the next cycle of the switches.

While I have disclosed in Figure 1 a mechanical switching device, yet I contemplate that any well known switching equivalent may be substituted therefor. One such equivalent is an electronic switch, and for the purpose of illustration merely, I have shown in Fig. 3 how such a switch may be used in connection with my invention and as a substitute for my mechanical switch.

Referring to Fig. 3, it will be seen that the electronic switching arrangement selected for the purpose stated above comprises four gas discharge tubes 23, 24, 25 and 26. The anodes of the first three tubes 23, 24 and 25 are connected to the positive side of the first condenser 6, which is charged from a source of charging potential 28, through a half wave rectifier 27 and a resistance 9. The cathode of the first tube is connected to ground, while the cathode of the second tube 24 is connected to ground through an impedance network composed of a resistor 31 and a condenser 32 connected in parallel. The grid of the first tube 23 is connected directly to the cathode of the second tube. The anode of the fourth tube 26 is connected to the cathode of the third tube 25. The cathode of the fourth tube is connected to the positive side of said first condenser 6.

There is provided a source of positive pulses 30 which are produced in response to the beginning of each interval to be timed. These pulses are applied directly to the grids of the third and fourth tubes 25 and 26, and through a delay circuit 29, to the grid of the second tube 24. The second condenser 7 is connected between the cathode of the third tube 25 and ground. The voltage measuring device 10 is, as in Fig. 1, connected across said second condenser.

The gas discharge tubes in the above circuit may be of the so-called positive-grid type in which the potential on the control grid must be positive with respect to the cathode before the tube can fire, but this is merely a matter of convenience since it eliminates the necessity for a source of negative grid bias.

Initially there is a charge built up on the first condenser 6, thus rendering the anodes of the first three gas discharge tubes 23, 24 and 25 positive with respect to their respective cathodes, while the cathode of the fourth tube 26 is positive with its anode since there is no charge on the second condenser 7.

When a positive pulse is produced from the source 30, indicating the beginning of an interval to be measured, it will appear immediately on the grid of the third and fourth tubes 25 and 26. Since the anode of the third tube 25 is positive with respect to its cathode, it will fire immediately, thus transferring a portion of the charge from the first condenser 6 to the second condenser 7. The potentials across the two condensers 6 and 7 are thus substantially equalized and the tube 25 is extinguished. The fourth tube 26 will not fire at this time because its anode it negative with respect to its cathode.

The positive pulse that caused conduction of the third tube 25, after passing the delay circuit 29, also appears on the grid of the second tube 24 causing it to fire immediately. Although the delay in the delay circuit 29 is definite and distinct it should be only long enough to allow the third or, as will be shown later, the fourth tube to fire.

When the second tube fires, there is a potential difference developed across the resistor 31 and the condenser 32 in its cathode circuit. This potential is applied to the grid of the first tube 23, causing it to fire, providing a short circuit discharge path to ground for the first condenser 6. When the charging source 28 enters the negative half of its cycle, the condenser 6 is fully discharged, thus reducing the anode potential on the first and second tubes 23 and 24 to zero thereby extinguishing them, and the first condenser 6 begins to recharge for the first interval.

At the end of the first interval, which is the beginning of the next, another pulse is produced from the source 30 and is again applied directly to the grids of the third and fourth tubes 25 and 26, and through the delay circuit 29 to the grid of the second tube 24. Assume, however, this time, that the potential across the second condenser 7 is larger than that across the first condenser 6. Now the potential on the anode of the third tube 25 is negative with respect to its cathode and therefore cannot fire, but the anode of the fourth tube 26 is positive with respect to its cathode and does fire. Thus the actual transfer of energy, as in the circuit of Fig. 1 is from the second to the first condenser, and again the result is the same. The potentials across the two condensers are substantially equalized and the fourth tube is extinguished. The remainder of the sequence continues as above described.

Inasmuch as there is no synchronization between the triggering pulses from the source 30, and the charging potential from the source 28, the second tube 24 is used to assure that the first condenser 6 start charging at the beginning of a cycle of the charging source each time. From this it may be seen that the decay time of the parallel arrangement of the resistor 31 and the condenser 32, in the cathode circuit of the second tube 24, is preferable only as long as the time required for the charging source 28 to complete one half cycle.

As in the arrangement shown in Fig. 1, while each of the steps of the operation is separate and distinct, the total time consumed from the time the trigger pulse is applied to the grid of the third and fourth tubes 25 and 26 until the first condenser 6 is discharged and begins charging for the next interval is negligible.

Similarly, it is within the contemplation of my invention that electronic switching means may be substituted for the mechanical switches shown in Fig. 2.

Accordingly, what I claim is:

1. A time interval measuring device comprising in combination a source of charging potential, a first condenser, a series resistor connected between one side of said first condenser and said source, the other side of said first condenser being connected to ground, a second condenser, a sequential switch having a contact arm and at least three contact positions, the contact arm of said switch being connected to the junction between said resistor and said first condenser, the first or charging position being an open contact, the second position connecting said first condenser in parallel with said second condenser, the third position being so connected as to short circuit said first condenser, a second switch connected to short circuit said second condenser during the interval between the time the contact arm of said first switch leaves said first contact position and closes on the second contact position, and a potential measuring device connected to said second condenser to measure the potential established thereon by said first switching means.

2. A time interval measuring device comprising in combination a source of charging potential, a first condenser, a series resistor connected between one side of said first condenser and said source, the other side of said first condenser being connected to ground, a second condenser, a first sequential switch having a contact arm and four contact positions, the contact arm of said first switch being connected to the junction between said resistor and said first condenser, the first or charging position and the second position of said first switch being open contacts, the third position connecting said first condenser in parallel with said second condenser, the fourth position being so connected as to short circuit said first condenser, a second sequential switch having a contact arm and four contact positions, said second switch being cooperatively connected mechanically to said first switch, the first, third, and fourth positions of said second switch being open contacts, the second position short circuiting said second condenser, and a potential measuring device connected to said second condenser to measure the potential established thereon by said first switching means.

3. A time interval measuring device comprising in combination a source of charging potential, a first condenser, a series resistor connected between one side of said first condenser and said source, the other side of said condenser being connected to ground, a second condenser, a first sequential switch having a contact arm and four contact positions, the contact arm of said first switch being connected to the junction between said resistor and said first condenser, the first or charging position and the second position of said first switch being open contacts, the third position connecting said first condenser in parallel with said second condenser, the fourth position being so connected as to short circuit said first condenser, a second sequential switch having a contact arm and four contact positions, said second switch being cooperatively connected mechanically to said first switch, the first, third and fourth positions of said second switch being open contacts, the second position short circuiting said second condenser, means measuring the potential established on said second condenser comprising a high impedance vacuum tube having a cathode, an anode, and a control electrode, said control grid connected to the normally ungrounded side of said second condenser, a source of anode potential connected between said anode and ground, a current measuring meter serially connected to said cathode, and a variable resistor serially connected between said meter and ground.

JOSEPH G. BEARD.

References Cited in the file of this patent
UNITED STATES PATENTS

| Number | Name | Date |
|---|---|---|
| 2,226,185 | Sturm et al. | Dec. 24, 1940 |
| 2,301,195 | Bradford | Nov. 10, 1942 |
| 2,473,542 | Philpott | June 21, 1949 |
| 2,492,617 | Boland | Dec. 29, 1949 |
| 2,511,868 | Newson | June 20, 1950 |